United States Patent
Hart et al.

(10) Patent No.: US 9,640,179 B1
(45) Date of Patent: May 2, 2017

(54) TAILORING BEAMFORMING TECHNIQUES TO ENVIRONMENTS

(71) Applicant: Amazon Technologies, Inc., Seattle, WA (US)

(72) Inventors: Gregory Michael Hart, Mercer Island, WA (US); Kavitha Velusamy, San Jose, CA (US); William Spencer Worley, III, Half Moon Bay, CA (US)

(73) Assignee: Amazon Technologies, Inc., Seattle, WA (US)

( * ) Notice: Subject to any disclaimer, the term of this patent is extended or adjusted under 35 U.S.C. 154(b) by 701 days.

(21) Appl. No.: 13/928,751

(22) Filed: Jun. 27, 2013

(51) Int. Cl.
*G10L 15/20* (2006.01)

(52) U.S. Cl.
CPC .................. *G10L 15/20* (2013.01)

(58) Field of Classification Search
CPC ............ G10L 2021/02166; G10L 25/78
USPC .................................................... 704/233
See application file for complete search history.

(56) References Cited

U.S. PATENT DOCUMENTS

| | | | |
|---|---|---|---|
| 7,418,392 B1 | 8/2008 | Mozer et al. | |
| 7,720,683 B1 | 5/2010 | Vermeulen et al. | |
| 7,774,204 B2 | 8/2010 | Mozer et al. | |
| 9,100,735 B1* | 8/2015 | Taenzer | H04R 3/005 |
| 2007/0263888 A1* | 11/2007 | Melanson | H04S 3/00 381/300 |
| 2012/0093344 A1* | 4/2012 | Sun | H04R 3/005 381/122 |
| 2012/0223885 A1 | 9/2012 | Perez | |
| 2013/0096922 A1* | 4/2013 | Asaei | G01S 3/8006 704/270 |

FOREIGN PATENT DOCUMENTS

WO  WO2011088053 A2  7/2011

OTHER PUBLICATIONS

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

* cited by examiner

*Primary Examiner* — Jakieda Jackson
(74) *Attorney, Agent, or Firm* — Lee & Hayes, PLLC (57) ABSTRACT

Techniques for tailoring beamforming techniques to environments such that processing resources may be devoted to a portion of an audio signal corresponding to a lobe of a beampattern that is most likely to contain user speech. The techniques take into account both acoustic characteristics of an environment and heuristics regarding lobes that have previously been found to include user speech.

22 Claims, 9 Drawing Sheets

BEAMFORMER COEFFICIENTS DATASTORE
126

| BEAM-PATTERN NAME 402 | NUMBER OF LOBES 404 | BEAMFORMER COEFFICIENTS 406 |
|---|---|---|
| A | 6 lobe, ... | $A_1, A_2, A_3, A_4, ..., A_M$ |
| B | 6 lobe, ... | $B_1, B_2, B_3, B_4, ..., B_M$ |
| C | 6 lobe, ... | $C_1, C_2, C_3, C_4, ..., C_M$ |
| D | 8 lobe, ... | $D_1, D_2, D_3, D_4, ..., D_M$ |
| E | 6 lobe, ... | $E_1, E_2, E_3, E_4, ..., E_M$ |
| F | 8 lobe, ... | $F_1, F_2, F_3, F_4, ..., F_M$ |

TAILORING BEAMFORMING TECHNIQUES TO ENVIRONMENTS

BACKGROUND

Homes are becoming more wired and connected with the proliferation of computing devices such as desktops, tablets, entertainment systems, and portable communication devices. As computing devices evolve, many different ways have been introduced to allow users to interact with these devices, such as through mechanical means (e.g., keyboards, mice, etc.), touch screens, motion, and gesture. Another way to interact with computing devices is through speech.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

This disclosure describes, in part, techniques for tailoring beamforming techniques to environments such that processing resources may be devoted to a portion of an audio signal corresponding to a lobe of a beampattern that is most likely to contain user speech.

Beamforming is the process of applying a set of beamformer coefficients to the signal data to create beampatterns, or effective directions of gain or attenuation. In some implementations, these volumes may be considered to result from constructive and destructive interference between signals from individual microphones in a microphone array.

Application of the set of beamformer coefficients to the signal data results in processed data expressing the beampattern associated with those beamformer coefficients. Application of different beamformer coefficients to the signal data generates different processed data. Several different sets of beamformer coefficients may be applied to the signal data, resulting in a plurality of simultaneous beampatterns. Each of these beampatterns may have a different shape, direction, gain, and so forth.

Beamformer coefficients may be pre-calculated to generate beampatterns with particular characteristics. Such pre-calculation reduces overall computational demands. In other instances, meanwhile, the coefficients may be calculated on an on-demand basis. In either instance, the coefficients may be stored locally, remotely such as within cloud storage, or distributed across both. A given beampattern may be used to selectively gather signals from a particular spatial location where a signal source is present. The selected beampattern may be configured to provide gain or attenuation for the signal source. For example, the beampattern may be focused on a particular user's head allowing for the recovery of the user's speech while attenuating noise from an operating air conditioner that is across the room and in a different direction than the user relative to a device that captures the audio signals Such spatial selectivity by using beamforming allows for the rejection or attenuation of undesired signals outside of the beampattern. The increased selectivity of the beampattern improves signal-to-noise ratio for the audio signal. By improving the signal-to-noise ratio, the accuracy of speech recognition performed on the audio signal is improved.

The processed data from the beamformer module may then undergo additional filtering or be used directly by other modules. For example, a filter may be applied to processed data which is acquiring speech from a user to remove residual audio noise from a machine running in the environment.

While beamforming alone may increase a signal-to-noise (SNR) ratio of an audio signal, combining known acoustic characteristics of an environment (e.g., a room impulse response (RIR)) and heuristic knowledge of previous beampattern lobe selection may provide an even better indication of a speaking user's likely location within the environment. In some instances, a device includes multiple microphones that capture audio signals that include user speech. As is known and as used herein, "capturing" an audio signal includes a microphone transducing audio waves of captured sound to an electrical signal and a codec digitizing the signal. The device may also include functionality for applying different beampatterns to the captured audio signals, with each beampattern having multiple lobes. By identifying lobes most likely to contain user speech using the combination discussed above, the techniques enable devotion of additional processing resources of the portion of an audio signal most likely to contain user speech to provide better echo canceling and thus a cleaner SNR ratio in the resulting processed audio signal.

To determine a value of an acoustic characteristic of an environment (e.g., an RIR of the environment), the device may emit sounds at known frequencies (e.g., chirps, text-to-speech audio, music or spoken word content playback, etc.) to measure a reverberant signature of the environment to generate an RIR of the environment. Measured over time in an ongoing fashion, the device may be able to generate a consistent picture of the RIR and the reverberant qualities of the environment, thus better enabling the device to determine or approximate where it is located in relation to walls or corners of the environment (assuming the device is stationary). Further, if the device is moved, the device may be able to determine this change by noticing a change in the RIR pattern. In conjunction with this information, by tracking which lobe of a beampattern the device most often selects as having the strongest spoken signal path over time, the device may begin to notice patterns in which lobes are selected. If a certain set of lobes (or microphones) is selected, the device can heuristically determine the user's typical speaking position in the environment. The device may devote more CPU resources to digital signal processing (DSP) techniques for that lobe or set of lobes. For example, the device may run acoustic echo cancelation (AEC) at full strength across the three most commonly targeted lobes, instead of picking a single lobe to run AEC at full strength. The techniques may thus improve subsequent automatic speech recognition (ASR) results as long as the device is not rotated or moved. And, if the device is moved, the techniques may help the device to determine this change by comparing current RIR results to historical ones to recognize differences that are significant enough to cause the device to begin processing the signal coming from all lobes approximately equally, rather than focusing only on the most commonly targeted lobes.

The devices and techniques introduced above may be implemented in a variety of different architectures and contexts. One non-limiting and illustrative implementation is described below.

Figure 1:
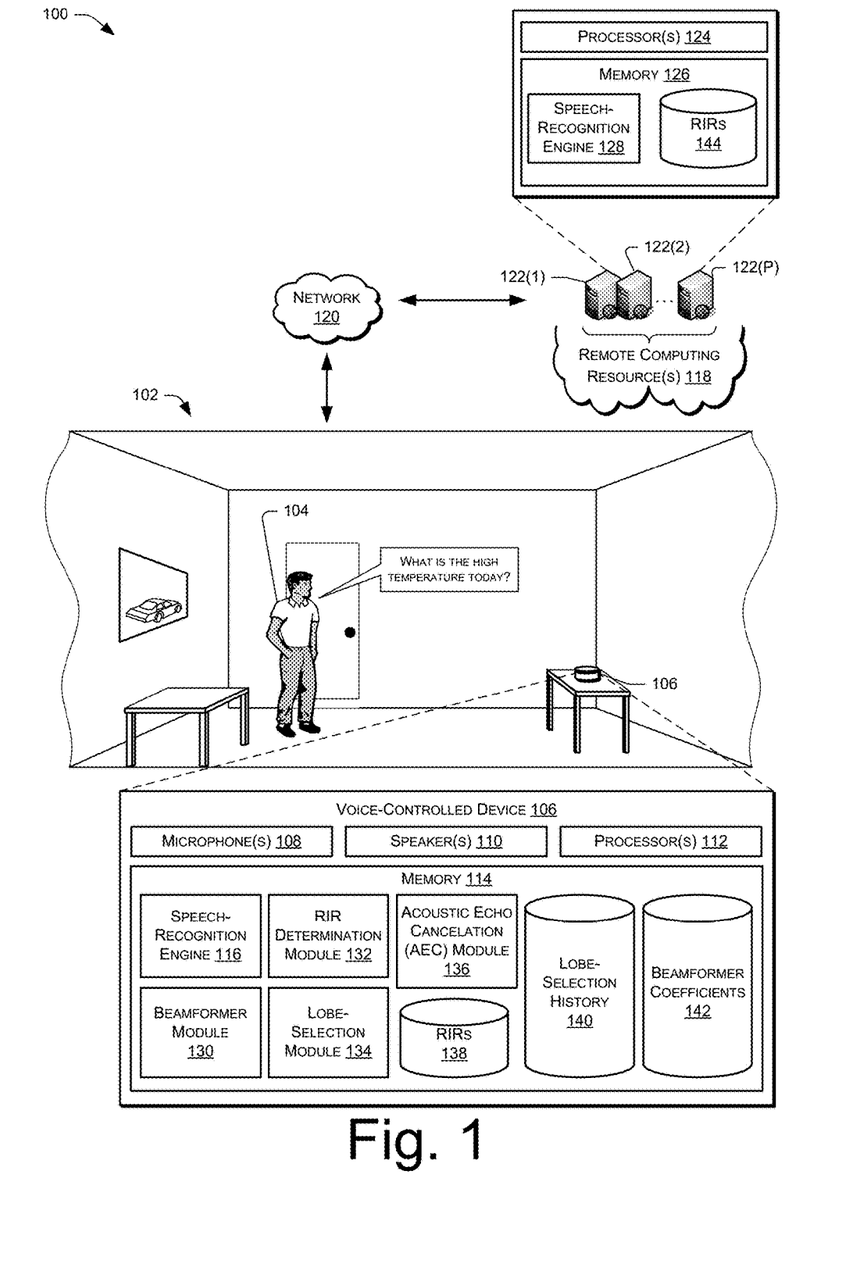
FIG. 1 shows an illustrative voice interaction computing architecture set in a home environment. The architecture includes a voice-controlled device physically situated in the home and communicatively coupled to remote computing resources. The voice-controlled device may use beamforming techniques to focus on certain portions of the environment when capturing audio signals that may include user speech.

FIG. 1 shows an illustrative voice interaction computing architecture 100 set in a home environment 102 that includes a user 104. The architecture 100 also includes an electronic voice-controlled device 106 with which the user 104 may interact. In the illustrated implementation, the voice-controlled device 106 is positioned on a table within a room of the home environment 102. In other implementations, it may be placed or mounted in any number of locations (e.g., ceiling, wall, in a lamp, beneath a table, under a chair, etc.). Further, more than one device 106 may be positioned in a single room, or one device may be used to accommodate user interactions from more than one room.

Generally, the voice-controlled device 106 has a microphone array comprising multiple microphones 108 and a speaker unit comprising at least one speaker 110 to facilitate audio interactions with the user 104 and/or other users. The microphones 108 may, in some instances, be dispersed around a perimeter of the device 106 in order to apply beampatterns to audio signals based on sound captured by the microphones 108, as described in detail below.

In some instances, the voice-controlled device 106 is implemented without a haptic input component (e.g., keyboard, keypad, touch screen, joystick, control buttons, etc.) or a display. In certain implementations, a limited set of one or more haptic input components may be employed (e.g., a dedicated button to initiate a configuration, power on/off, etc.). Nonetheless, the primary and potentially only mode of user interaction with the electronic device 106 may be through voice input and audible output. One example implementation of the voice-controlled device 106 is provided below in more detail with reference to FIG. 9.

The microphones 108 of the voice-controlled device 106 detect audio from the environment 102, such as sounds uttered from the user 104. As illustrated, the voice-controlled device 106 includes one or more processor(s) 112 and memory 114, which stores or otherwise has access to a speech-recognition engine 116. The speech-recognition engine 116 performs speech recognition on audio signals captured by the microphone, such as utterances spoken by the user 104. The voice-controlled device 106 may perform certain actions in response to recognizing different speech from the user 104. The user may speak predefined commands (e.g., "Awake"; "Sleep"), or may use a more casual conversation style when interacting with the device 106 (e.g., "I'd like to go to a movie. Please tell me what's playing at the local cinema.").

In some instances, the voice-controlled device 106 may operate in conjunction with or may otherwise utilize computing resources 118 that are remote from the environment 102. For instance, the voice-controlled device 106 may couple to the remote computing resources 118 over a network 120. As illustrated, the remote computing resources 118 may be implemented as one or more servers 122(1), 122(2), . . . , 122(P) and may, in some instances, form a portion of a network-accessible computing platform implemented as a computing infrastructure of processors, storage, software, data access, and so forth that is maintained and accessible via a network such as the Internet. The remote computing resources 118 do not require end-user knowledge of the physical location and configuration of the system that delivers the services. Common expressions associated for these remote computing resources 118 include "on-demand computing", "software as a service (SaaS)", "platform computing", "network-accessible platform", "cloud services", "data centers", and so forth.

The servers 122(1)-(P) may include one or more processors 124 and memory 126. As illustrated, the memory 126 may store and utilize a speech-processing engine 128 for receiving audio signals from the device 106, recognizing speech and, potentially, causing performance of an action in response. In addition, the engine 128 may provide audio for output on a client device (e.g., the device 106) via text-to-speech (TTS). In some examples, the voice-controlled device 106 may upload audio data to the remote computing resources 118 for processing, given that the resources 118 may have a computational capacity that far exceeds the computational capacity of the voice-controlled device 106. Therefore, the voice-controlled device 106 may utilize the speech-processing engine 128 for performing relatively complex analysis on audio captured from the environment 102.

Regardless of whether the speech recognition occurs locally or remotely from the environment 102, the voice-controlled device 106 may receive vocal input from the user 104 and the device 106 and/or the resources 118 may perform speech recognition to interpret a user's operational request or command. The requests may be for essentially any type of operation, such as database inquires, requesting and consuming entertainment (e.g., gaming, finding and playing music, movies or other content, etc.), personal management (e.g., calendaring, note taking, etc.), online shopping, financial transactions, and so forth. In some instances, the device 106 also interacts with a client application stored on one or more client devices of the user 104, which may store a "companion application".

In some instances, the user 104 may also interact with the device 106 through a "companion application" running on another client device, such as a mobile phone, tablet computing device, desktop computer or the like of the user. For instance, the user 104 may utilize a graphical user interface (GUI) of the companion application displayed on the user's client device to make requests to the device 106 in lieu of voice commands. Additionally or alternatively, the device 106 may communicate with the companion application to provide information to the user 104, such as previous voice commands provided to the device 106 by the user (and how the device interpreted these commands), content that is supplementary to a voice command issued by the user (e.g., cover art for a song playing on the device 106 as requested by the user 104), advertisements, and the like. In addition, in some instances the device 106 may send an authorization request to a companion application in response to receiving a voice command, such that the device 106 does not comply with the voice command until receiving permission in the form of a user response received via the companion application.

The voice-controlled device 106 may communicatively couple to the network 120 via wired technologies (e.g., wires, USB, fiber optic cable, etc.), wireless technologies (e.g., WiFi, RF, cellular, satellite, Bluetooth, etc.), or other connection technologies. The network 120 is representative of any type of communication network, including data and/or voice network, and may be implemented using wired infrastructure (e.g., cable, CAT5, fiber optic cable, etc.), a wireless infrastructure (e.g., WiFi, RF, cellular, microwave, satellite, Bluetooth, etc.), and/or other connection technologies.

As illustrated, the memory 114 of the voice-controlled device 106 may also have access to a beamformer module 130, a room impulse response (RIR) determination module 132, a lobe-selection module 134, and an acoustic echo cancelation (AEC) module 136. In addition, the memory 114 may also have access to a datastore 138 storing one or more previously measured RIRs associated with the voice-controlled device 106 (and potentially RIRs associated with other devices in the environment and/or other, possibly remote, environments), a datastore 140 storing a history of lobes that have been selected or identified as including user speech, and a datastore 142 storing one or more sets of beamformer coefficients 142.

As described above, the microphones 108 capture audio signals based on sound within the environment 102, which may include speech from the user 104. The beamformer module 130 functions to apply one or more sets of the beamformer coefficients 142 to the audio signals to create beampatterns, or effective directions of gain or attenuation. As illustrated and described below, the beampatterns include multiple lobes, each altering a gain from a respective region within the environment 102. In some instances, the remote computing devices 118 may also have access to a datastore 144 that may additionally or alternatively store RIR values. In some instances, the datastore 142 that is local to the device may store one or more of the most recent RIR values, while the remote datastore 144 may store an entire history of the RIRs for the environment 102.

The RIR determination module 132, meanwhile, may function to determine a room impulse response (RIR) of the environment relative to the device 106 and may store the RIR in the datastore 138. In some instances, the module 132 associates each RIR with a timestamp such that a history of the RIRs of the environment 102 is maintained. To determine an RIR, the module 132 may instruct the speaker 110 to emit a known sound within the environment 102. The microphones 108 then capture sound of the known sound that is reflected by the environment (e.g., off walls, the ceiling, the floor, objects, etc.). The microphones 108 may then capture an audio signal based on this reflected sound and the RIR determination module 132 may compare the known sound to the reflected sound represented by the captured audio signal to identify variations there between. The RIR determination module 132 then calculates an RIR of the environment 102 based on these variations and stores this information in the datastore 138. As is known, this measured RIR may indicate a level of echo coming from different directions relative to the device 106, which aids in the device 106 determining if it is near a wall, corner, or other object that occupies a lobe of a particular beampattern.

Figure 6:
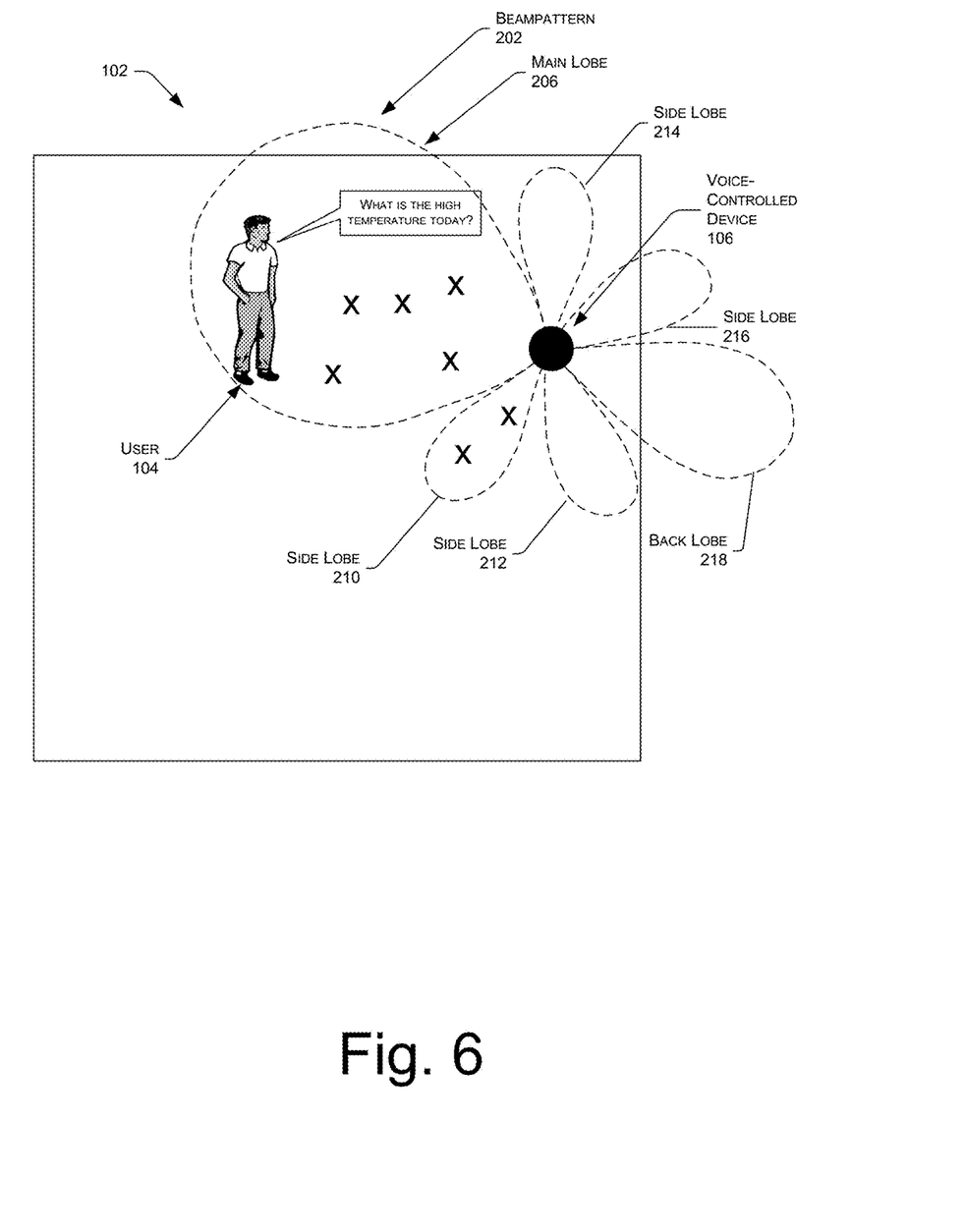
FIG. 6 illustrates an example beampattern in the environment of FIG. 1 and indications of lobes of the beampattern in which user speech was previously found.

The lobe-selection module 134, meanwhile, functions to select one or more lobes of a beampattern to enhance based on the RIR of the environment 102, described above, as well as with reference to a history of lobes that have previously been found to include user speech. For instance, because the RIR may indicate when the device 106 is near a wall or other occluding object, and the direction of that wall or object relative to the device 106, the lobe-selection module may take that into account when determining which lobes of a beampattern to enhance. For instance, the lobe-selection module 132 may be less likely to select lobes that overlap more with a wall or other occluding object, as illustrated in FIG. 6 and discussed below.

In addition to referencing the RIR, the lobe selection module 132 may reference a history of which lobes have previously been found to include user speech. That is, if particular lobe(s) of a beampattern correspond to regions of an environment 102 that have been found to often include user speech, then the lobe selection module 132 may increase the likelihood that these particular lobes will be enhanced. For instance, the lobe-selection module 132 may analyze the datastore 140 to identify which lobes have previously been found to include user speech a threshold number of times or a threshold percentage of the time. Additionally or alternatively, the module 132 may identify the lobe(s) that have most recently been found to include user speech (e.g., may identify the lobe that was last found to include user speech).

The lobe-selection module 132 may then use the RIR measurement, the heuristics associated with previous lobe-selections, and an amount of energy associated with each lobe to select one or more lobes to enhance. That is, the module 132 may identify a portion of a process audio signal (corresponding to the selected lobes) to devote more processing resources too when preparing the audio signal by, for instance, reducing an amount of echo in the audio signal. For instance, the AEC module 136 may apply more processing resources to preparing the portion of the audio signal corresponding to the selected lobes as compared to a remainder of the audio signal. Furthermore, "enhancing" a particular portion(s) of an audio signal may also include copying the audio signal and enhancing portion(s) corresponding to the particular portion.

By focusing processing resources on a portion of an audio signal most likely to include user speech, the SNR of that portion may be increased as compared to the SNR if processing resources were spread out equally to the entire audio signal. This higher SNR for the most pertinent portion of the audio signal may increase the efficacy of the speech-recognition engine 116 and/or the speech-recognition engine 128 when performing speech recognition on the resulting audio signal.

Figure 2:
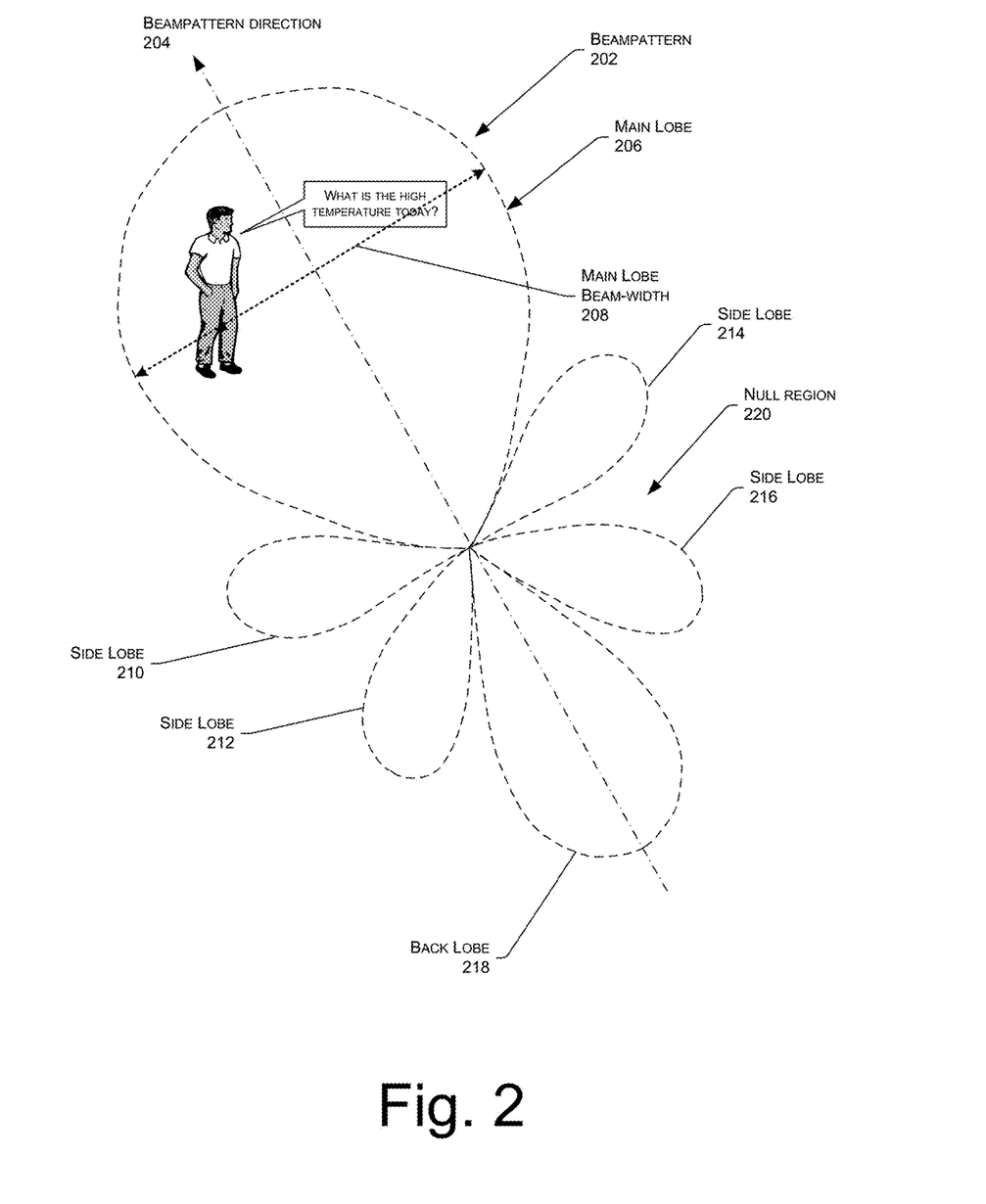
FIG. 2 illustrates a schematic of a beampattern formed by applying beamforming coefficients to signal data acquired from a microphone array of the voice-controlled device of FIG. 1.

FIG. 2 illustrates a schematic of a beampattern 202 formed by applying beamforming coefficients to signal data acquired from a microphone array of the voice-controlled device 106 of FIG. 1. As mentioned above, the beampattern 202 results from the application of a set of beamformer coefficients to the signal data. The beampattern generates directions of effective gain or attenuation. In this illustration, the dashed line indicates isometric lines of gain provided by the beamforming coefficients. For example, the gain at the dashed line here may be+12 decibels (dB) relative to an isotropic microphone.

The beampattern 202 may exhibit a plurality of lobes, or regions of gain, with gain predominating in a particular direction designated the beampattern direction 204. A main lobe 206 is shown here extending along the beampattern direction 204. A main lobe beam-width 208 is shown, indicating a maximum width of the main lobe 206. In this example, the beampattern 202 also includes side lobes 210, 212, 214, and 216. Opposite the main lobe 206 along the beampattern direction 204 is the back lobe 218. Disposed around the beampattern 202 are null regions 220. These null regions are areas of attenuation to signals. In the example, the user 104 resides within the main lobe 206 and benefits from the gain provided by the beampattern 202 and exhibits an improved SNR ratio compared to a signal acquired with non-beamforming. In contrast, if the user 104 were to speak from a null region, the resulting audio signal may be significantly reduced. As shown in this illustration, the use of the beampattern provides for gain in signal acquisition compared to non-beamforming. Beamforming also allows for spatial selectivity, effectively allowing the system to "turn a deaf ear" on a signal which is not of interest.

Figure 3:
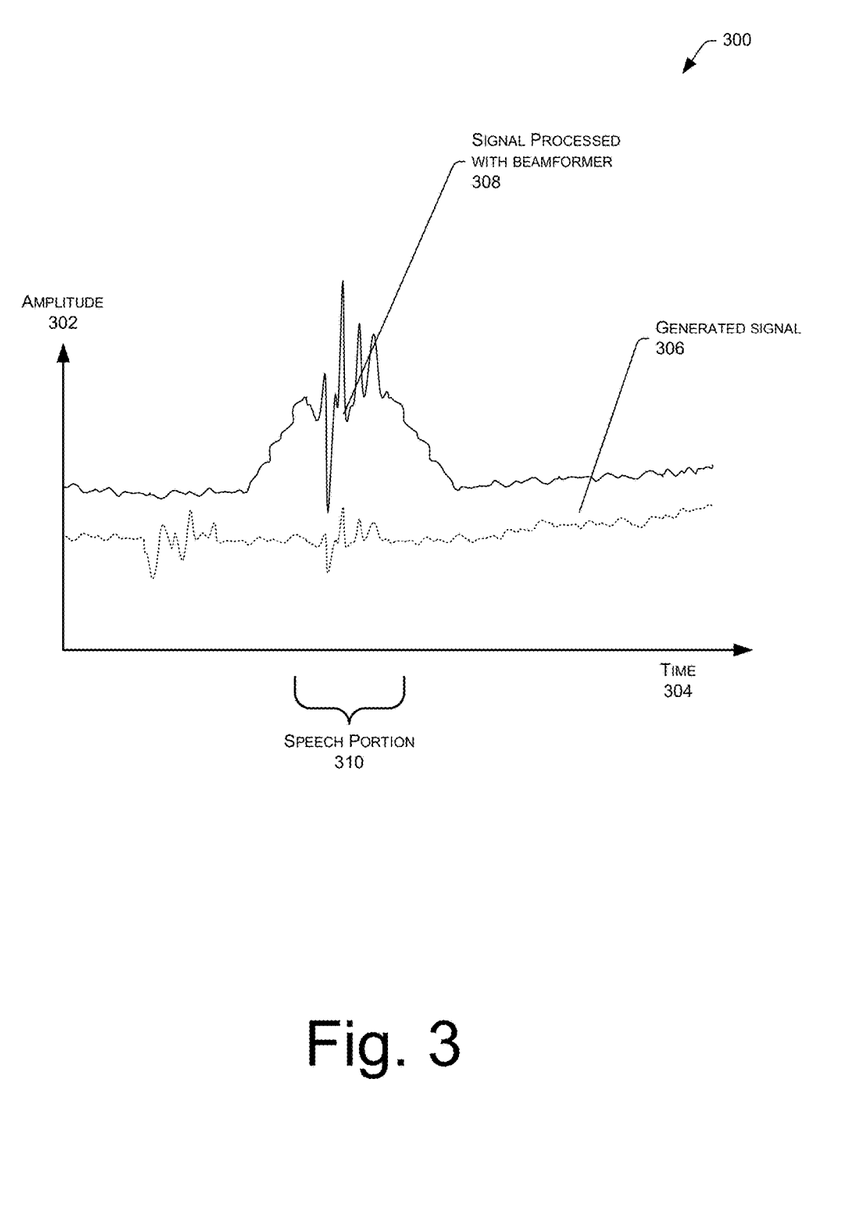
FIG. 3 is a graph illustrating improvement in signal acquisition when using beamforming as compared to non-beamforming.

FIG. 3 is an example graph 300 illustrating the improvement in signal recovery when using beamforming as compared to non-beamforming. The graph 300 indicates amplitude 302 of audio signals over time 304. First, the graph 300 illustrates a dotted line representing an audio signal 306 from the microphone array 108 without beamforming applied. In addition, the graph 300 illustrates a processed audio signal 308 after beamforming has been applied to the audio signal 306. As illustrated, an amplitude of a portion 310 of the audio signals corresponding to speech of a user is much higher in the processed audio signal 308 as compared to the audio signal 306. This increased amplitude increases the SNR of the speech portion 310 and, therefore, increases the accuracy of automatic speech recognition (ASR) performed thereon. The processed signal 308 may also lessen the effect of noise within the environment, such as noise from an air conditioner in the room that is not in the direction of a speaking user.

Figure 4:
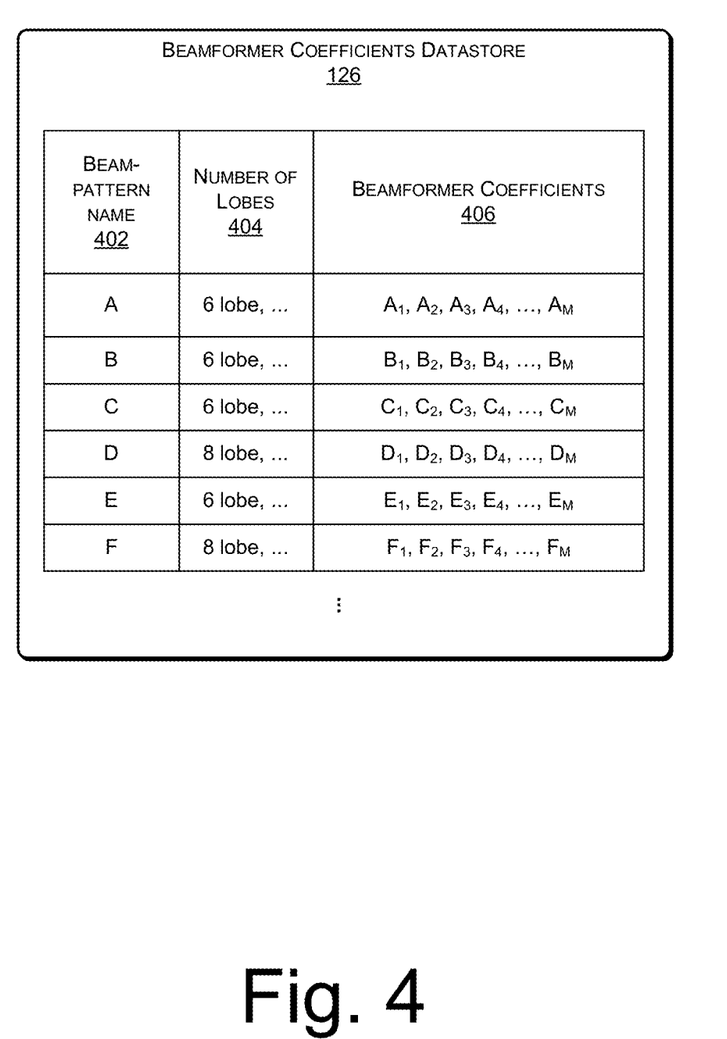
FIG. 4 is an illustrative diagram of a beamformer coefficients datastore configured to store pre-calculated beamformer coefficients and associated data.

FIG. 4 is an illustrative diagram 400 of the beamformer coefficients datastore 142. The beamformer coefficients datastore 142 is configured to store pre-calculated or recently generated beamformer coefficients. The beamformer coefficient may be considered a form of weighting applied to a signal from each of the microphones in the microphone array 108. As described above, by applying a particular set of beamformer coefficients, a particular beampattern may be obtained.

The beamformer coefficients datastore 142 may be configured to store a beampattern name 402, as well as a number of lobes 404 of the beampattern and beampattern coefficients 406 that define a respective beampattern. In some instances, the datastore 142 may also store the directionality of the beampattern. This directionality may be designated for one or more lobes of the beampattern relative to the physical arrangement of the microphone array 108. For example only and not by way of limitation, the directionality of the beampattern is the beampattern direction 204, that is the direction of the main lobe 206. The directionality may include an azimuth direction and an elevation direction. Other characteristics of the beampattern such as topology, size, relative gain, frequency response, and so forth may also be stored.

The beamformer coefficients datastore 142 may also store the beamformer coefficients 406, which generate each beampattern. When applied to an audio signal, these coefficients act to weigh or modify those signals to generate a particular beampattern.

The beamformer coefficients datastore 126 may store one or more beampatterns. For example, beampatterns having gain in different directions may be stored. By pre-computing, storing, and retrieving coefficients, computational demands are reduced compared to calculation of the beamformer coefficients during processing.

Figure 5:
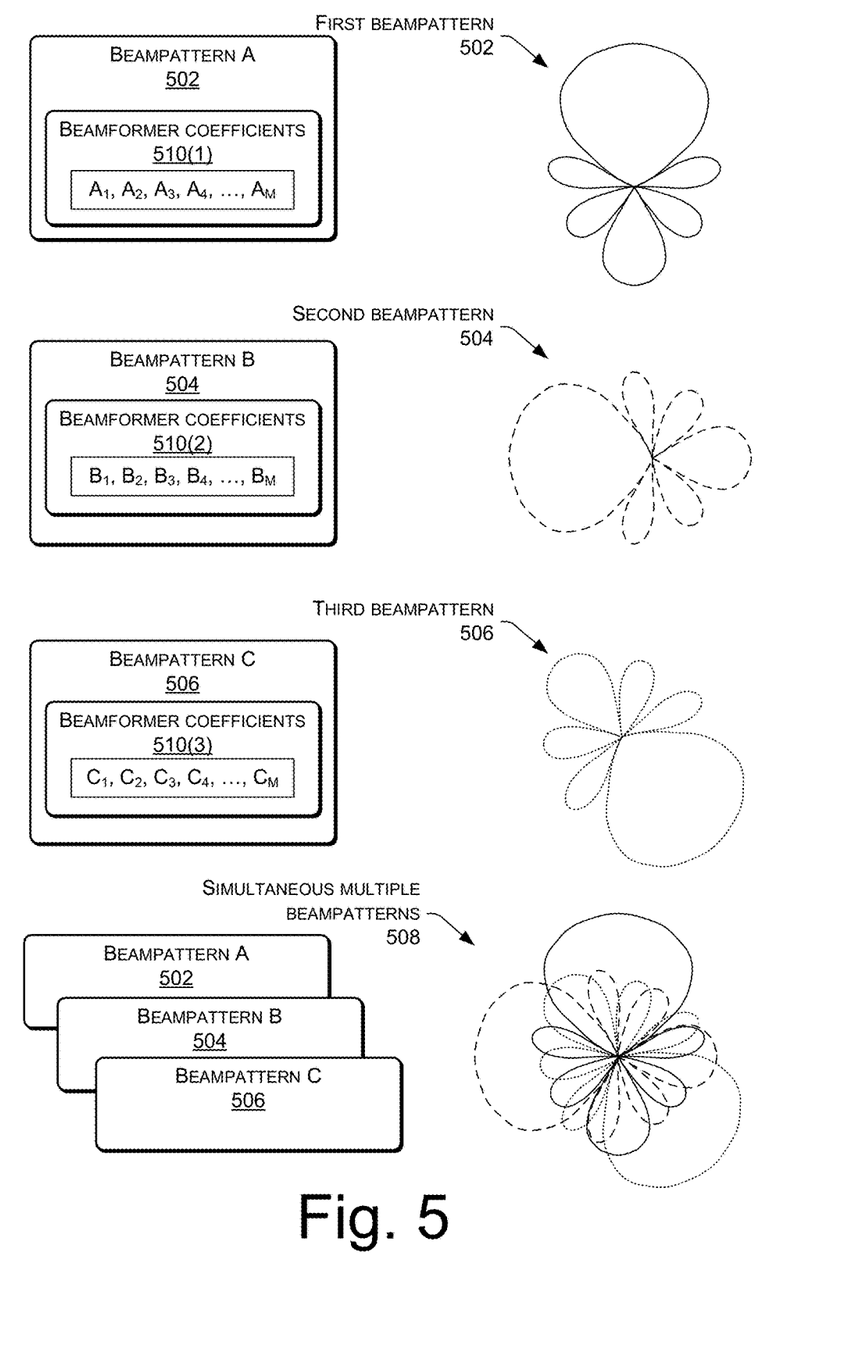
FIG. 5 illustrates a plurality of different beampatterns resulting from different beamformer coefficients and their potential simultaneous use.

FIG. 5 illustrates a plurality of different beampatterns resulting from different beamformer coefficients and their simultaneous use. Because the beampatterns are data constructs producing specific processed data, it is possible to generate a plurality of different beampatterns simultaneously from the same set of signal data.

As shown here, a first beampattern 502 is shown as generated by application beampattern A having beamformer coefficients 510(1). A second beampattern 504 having gain in a different direction and resulting from the beampattern coefficients 510(2) of beampattern B is also shown. A third beampattern 506 resulting from application of beampattern C's beamformer coefficients 510(3) points in a direction different from the first and second beampatterns.

As shown at 508, all three or more beampatterns may be simultaneously active. Thus, as shown in this example, three separate signal sources may be tracked, each with a different beampattern with associated beamformer coefficients. So long as the beamforming module 130 has access to computational capacity to process the incoming signal data from the microphone array 108, additional beampatterns may be generated. In addition, computational resources may be allocated more heavily or entirely to lobes more likely to include user speech, as discussed above and immediately below.

FIG. 6 illustrates the example beampattern 202 in the environment of FIG. 1 and indicates lobes of the beampattern in which user speech was previously found. As illustrated by the "x's", user speech has previously been detected with the main lobe 206 and the side lobe 210 of the beampattern 202. As such, processing resources may be devoted to enhancing a portion of an audio signal corresponding to these lobes, as compared to a remainder of the audio signal. In addition, FIG. 6 illustrates that a substantial portion of the back lobe 218 would theoretically extends beyond a wall of the environment, as would a substantial portion of the side lobe 216. In some instances, the device 106 may make this determination with reference to a measured RIR. By utilizing this RIR measurement information along with information regarding lobes in which user speech has often been found, the device 106 may focus its computational resources on those lobes most likely to contain user speech.

Figure 7:
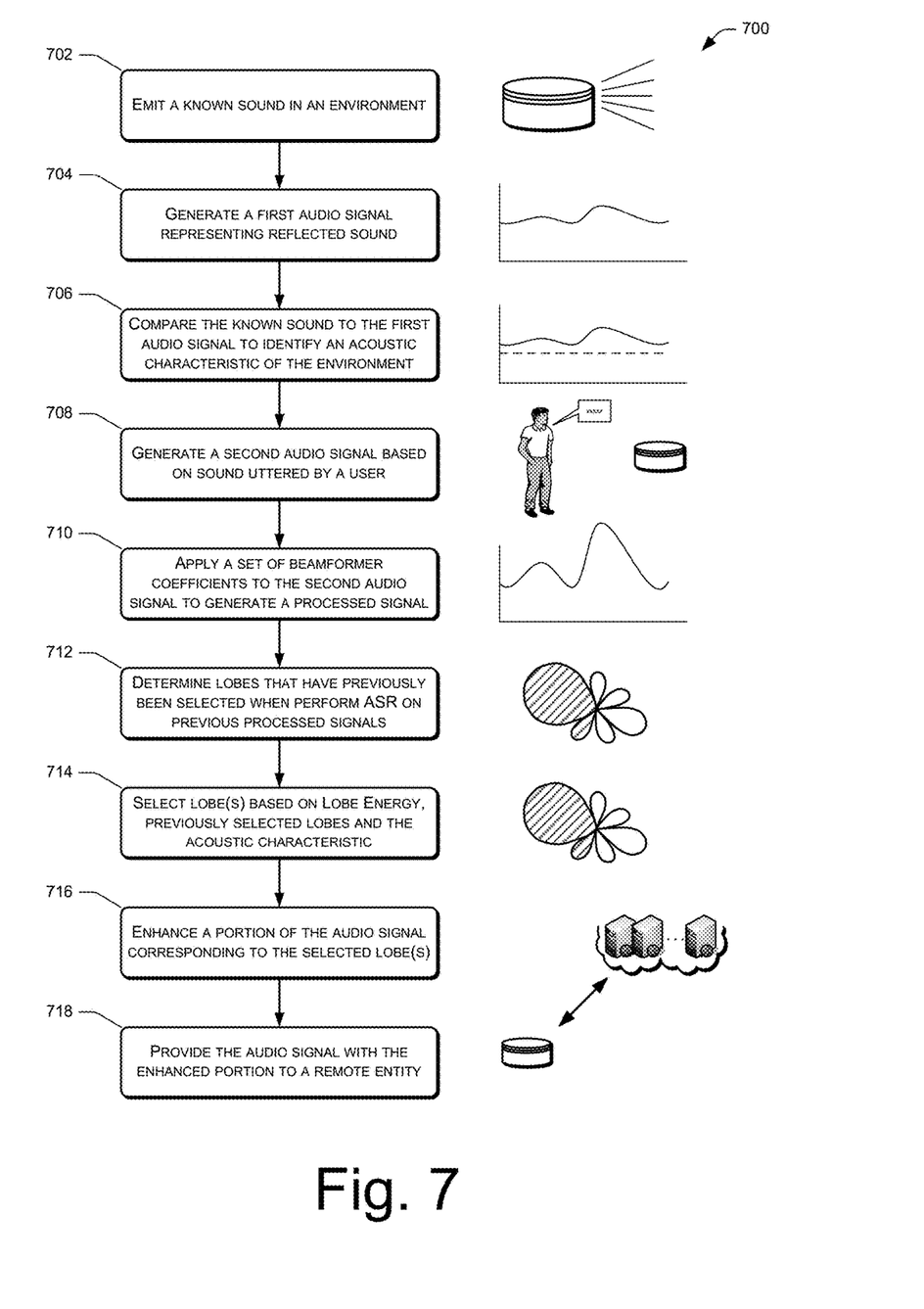
FIG. 7 illustrates an example process for selecting a portion of an audio signal with reference to an acoustic characteristic of an environment and with reference to which lobes of a beampattern have previously been found to include user speech.

FIG. 7 illustrates an example process 700 for selecting a portion of an audio signal with reference to an acoustic characteristic of an environment, such as an RIR, and with reference to which lobes of a beampattern have previously been found to include user speech. Each process described herein is illustrated as a logical flow graph, each operation of which represents a sequence of operations that can be implemented in hardware, software, or a combination thereof. In the context of software, the operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some embodiments the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

While the process 700 is described as being performed by the voice-controlled device 106, some or all of this process 700 may be described at the remote computing resources 118 and/or one or more other entities.

At 702, the voice-controlled device 106 emits a known sound in the environment 102. At 704, a microphone array of the device 108 captures an audio signal representing sound of the known sound that has been reflected from the environment and captured by the microphone array.

At 706, the device 106 compares the emitted known sound to the reflected sound represented in the audio signal to identify an acoustic characteristic of the environment, such as an RIR of the environment. For instance, the comparing may include comparing a frequency or amplitude of the respective sounds, a pitch or tone of the sounds, a volume of the sounds, or the like to determine the differences between the sounds and, with this information, to determine the RIR of the environment.

At 708, the microphone array captures a second audio signal, with this second audio signal including speech from a user within the environment. After capturing the second audio signal, the device 106, at 710, applies a set of beamformer coefficients to the second audio signal to generate a processed signal.

At 712, the device 106 determines lobes that have been previously selected as including speech when performing ASR on previous audio signals. At 714, the device 106 then selects lobes to enhance based on an amount of energy associated with each respective lobe, based on which lobes have previously been selected, and based on the measured value of the acoustic characteristic. For instance, the device 106 may select those lobe(s) that have previously been selected, assuming that the measured value of the acoustic characteristic hasn't changed since that initial selection and assuming that the portion of the audio signal corresponding to those lobe(s) includes sufficient energy to warrant analyzing that portion for user speech. If, however, the previously selected lobes do not include a threshold amount of energy, then the device 106 may determine that the lobes likely do not include user speech and, hence, may select different lobe(s) to enhance (if any).

At 716, the device 106 then enhances a portion of an audio signal corresponding to the selected one or more lobes. For instance, the device 106 may apply additional computing resources to reduce an amount of noise in this portion of the audio signal. Finally, at 718, the device 106 may provide the audio signal, including the enhanced portion, to the remote computing resources 118 or another entity for performing ASR thereon.

Figure 8:
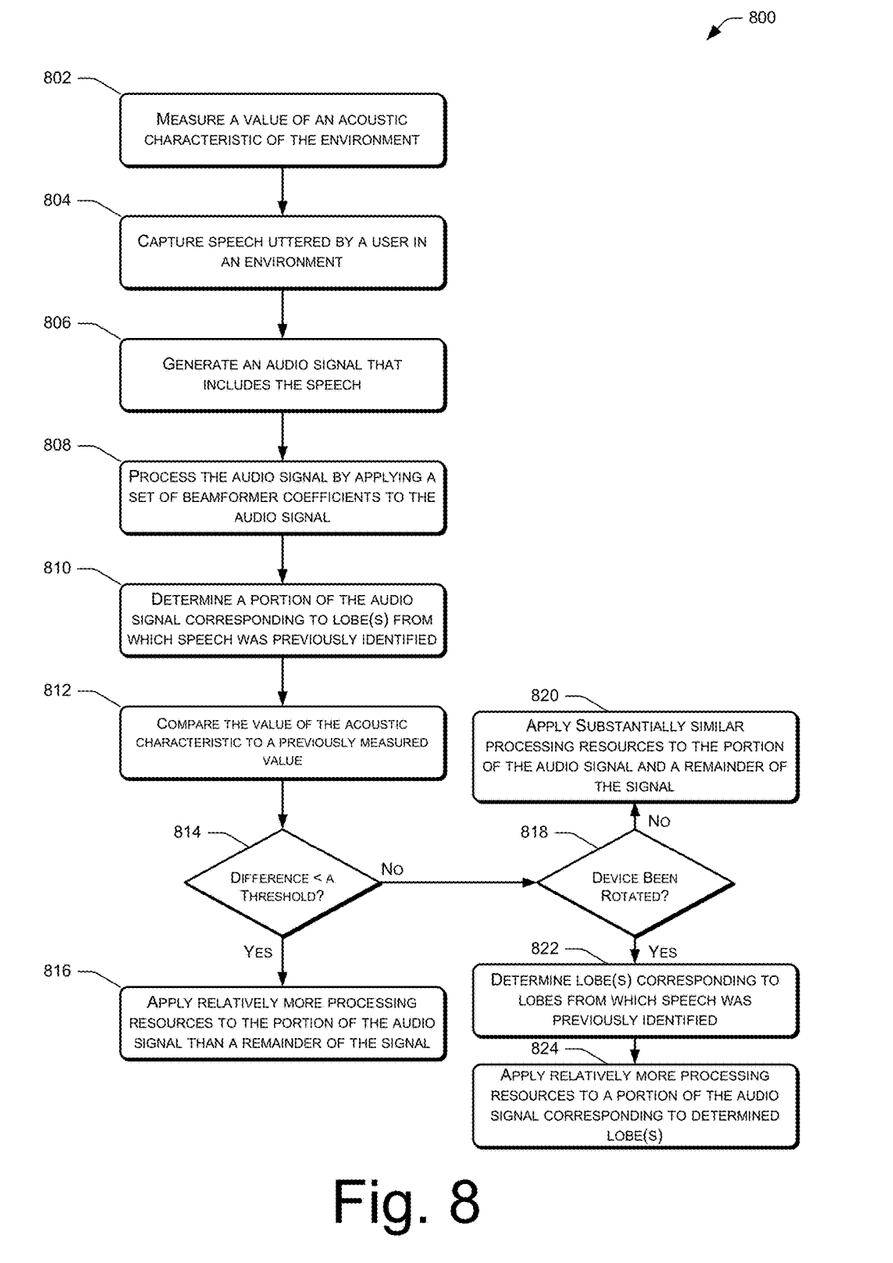
FIG. 8 is another example process for enhancing a portion of an audio signal with reference to an acoustic characteristic of an environment and with reference to which lobes of a beampattern have previously been found to include user speech.

FIG. 8 is another example process 800 for enhancing a portion of an audio signal with reference to an acoustic characteristic of an environment and with reference to which lobes of a beampattern have previously been found to include user speech.

At 802, the process 800 measures a value of an acoustic characteristic of an environment, such as an RIR of the environment, an amount and/or directionality of echo in the environment, or the like. At 804, the process 800 captures speech uttered by a user in an environment and, at 806, captures an audio signal that includes the speech. At 808, the process 800 processes the audio signal by applying a set of beamformer coefficients to the audio signal. At 810, the process determines a portion of the audio signal corresponding to one or more lobes from which speech has previously been identified.

At 812, the process 800 compares this value to a previously measured value of the acoustic characteristic and, at 814, determines whether a difference there between is less than a threshold. If so, then at 816 the process 800 applies relatively more processing resources to the portion of the audio signal that has previously been determined to include user speech.

If not, then at 818 the process 800 may determine whether the device has simply rotated but not moved. That is, the process 800 may determine whether the device's location has remained substantially the same while the device has been rotated, resulting in the changed value of the acoustic characteristic. The process 800 may make this determination in any number of ways, such as by receiving input from the user that the device has rotated, analyzing images of the environment to determine whether the device's location has changed, or the like. If the device has not been rotated (meaning that the device is likely to have moved given the changed values of the acoustic characteristic), then at 820 the process 800 applies substantially equal processing resources across the audio signal.

If, however, the device has been rotated then at 822 the process 800 may determine lobe(s) of the beampattern corresponding to the previously selected lobes. That is, because the device has simply rotated but not moved its location, the premise that users are most likely to speak from regions of the environment from which users previously spoke still holds true, although the lobes of the beampattern corresponding to these regions have now rotated along with the rotation of the device itself. As such, the process 800 may identify those lobes that now cover the regions previously covered by the previously selected lobes, prior to the rotation. Finally, at 824, the process 824 then enhances a portion of the audio signal corresponding to the lobes that have been determined at 822.

In this example, by comparing the value of the acoustic characteristic to a previously measured value, the process 800 is able to determine if the previously determined lobe selection heuristics will still likely lead to a logical selection of lobes to enhance. Stated otherwise, if the values of the acoustic characteristic have remained relatively stable, then a device may determine that it has not moved within the environment and, therefore, that lobes previously found to include user speech are likely to again include user speech. As such, the device may enhance these lobes to increase the efficacy of future ASR performed on the audio signal. Conversely, if the value of the acoustic characteristic has changed greatly, then the device may determine that it has been moved within the environment and, hence, the information regarding previously selected lobes might not reliably predict which lobes will now contain user speech.

In some instances, the process 800 may also take into account an amount of energy associated with the lobe(s) that have been previously selected. For instance, the process 800 may ensure that an amount of energy corresponding to these lobes (i.e., an amount of energy represented by the portion of the audio signal corresponding to these lobes) is greater than a threshold. If so, then the process 800 may again select these lobes for enhancement. If not, however, then the process 800 may not select these lobes, given that the lobes (lacking sufficient energy) are not likely to contain user speech. As such, the process 800 may apply substantially equal processing resources to the lobes, as shown at 818.

Figure 9:
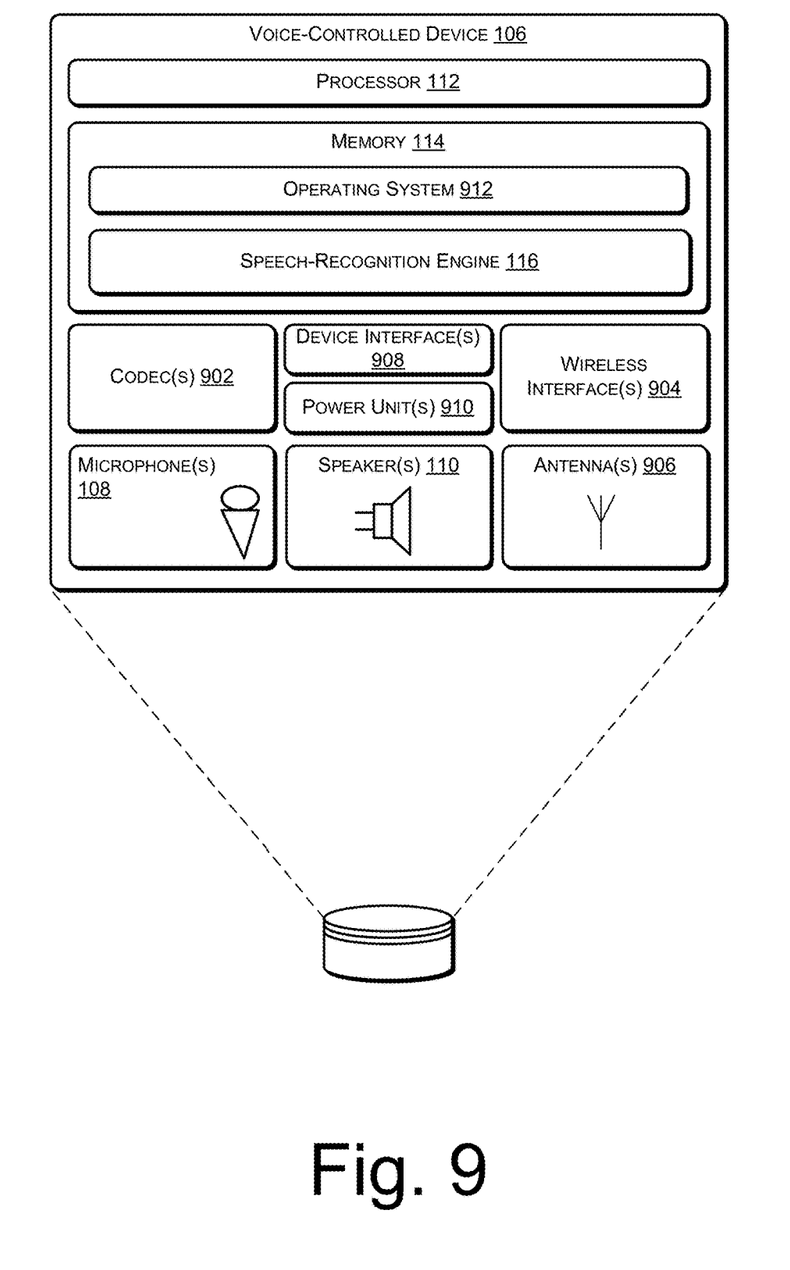
FIG. 9 shows a block diagram of selected functional components implemented in the voice-controlled device of FIG. 1.

FIG. 9 shows selected functional components of one implementation of the voice-controlled device 106 in more detail. Generally, the voice-controlled device 106 may be implemented as a standalone device that is relatively simple in terms of functional capabilities with limited input/output components, memory and processing capabilities. For instance, the voice-controlled device 106 does not have a keyboard, keypad, or other form of mechanical input in some implementations, nor does it have a display or touch screen to facilitate visual presentation and user touch input. Instead, the device 106 may be implemented with the ability to receive and output audio, a network interface (wireless or wire-based), power, and limited processing/memory capabilities.

In the illustrated implementation, the voice-controlled device 106 includes the processor(s) 112 and memory 114. The memory 114 may include computer-readable storage media ("CRSM"), which may be any available physical media accessible by the processor(s) 112 to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other medium which can be used to store the desired information and which can be accessed by the processor(s) 112.

The voice-controlled device 106 includes a microphone unit that comprises one or more microphones 108 to receive audio input, such as user voice input. The device 106 also includes a speaker unit that includes one or more speakers 110 to output audio sounds. One or more codecs 902 are coupled to the microphone(s) 108 and the speaker(s) 110 to encode and/or decode the audio signals. The codec may convert audio data between analog and digital formats. A user may interact with the device 106 by speaking to it, and the microphone(s) 108 captures an audio signal based on sound in the environment that may include the user speech. The codec(s) 902 encodes the user speech and transfers that audio data to other components. The device 106 can communicate back to the user by emitting audible statements through the speaker(s) 110. In this manner, the user interacts with the voice-controlled device simply through speech, without use of a keyboard or display common to other types of devices.

In the illustrated example, the voice-controlled device 106 includes one or more wireless interfaces 904 coupled to one or more antennas 906 to facilitate a wireless connection to a network. The wireless interface(s) 904 may implement one or more of various wireless technologies, such as wifi, Bluetooth, RF, and so on.

One or more device interfaces 908 (e.g., USB, broadband connection, etc.) may further be provided as part of the device 106 to facilitate a wired connection to a network, or a plug-in network device that communicates with other wireless networks. One or more power units 910 are further provided to distribute power to the various components on the device 106.

The voice-controlled device 106 is designed to support audio interactions with the user, in the form of receiving voice commands (e.g., words, phrase, sentences, etc.) from the user and outputting audible feedback to the user. Accordingly, in the illustrated implementation, there are no or few haptic input devices, such as navigation buttons, keypads, joysticks, keyboards, touch screens, and the like. Further there is no display for text or graphical output. In one implementation, the voice-controlled device 106 may include non-input control mechanisms, such as basic volume control button(s) for increasing/decreasing volume, as well as power and reset buttons. There may also be one or more simple light elements (e.g., LEDs around perimeter of a top portion of the device) to indicate a state such as, for example, when power is on or to indicate when a command is received. But, otherwise, the device 106 does not use or need to use any input devices or displays in some instances.

Several modules such as instruction, datastores, and so forth may be stored within the memory 114 and configured to execute on the processor(s) 112. An operating system module 912 is configured to manage hardware and services (e.g., wireless unit, Codec, etc.) within and coupled to the device 106 for the benefit of other modules. In addition, the memory 114 may include the speech-recognition engine 116 and the additional modules illustrated in FIG. 1.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. An apparatus comprising:
   one or more processors;
   a speaker;
   a microphone array; and
   one or more computer-readable media storing computer-executable instructions that, when executed by the one or more processors, cause the one or more processors to perform acts comprising:
      instructing the speaker to emit a known sound in an environment;
      generating a first audio signal representing at least sound of the known sound reflected from the environment and captured by the microphone array;
      comparing characteristics of the known sound to characteristics of the reflected sound representing in the first audio signal to determine an acoustic characteristic of the environment;
      generating a second audio signal based on sound uttered by a user in the environment and captured by the microphone array;
      applying a set of beamformer coefficients to the second audio signal to generate a processed audio signal representing a beampattern, the beampattern having multiple lobes each focused on a region within the environment;

determining which of the multiple lobes correspond to regions of the environment from which speech has previously been found to originate from;

selecting a lobe of the multiple lobes based at least in part on an amount of energy associated with the lobe, the acoustic characteristic of the environment, and whether previously processed audio signals associated with the lobe have previously been selected; and preparing the processed audio signal for automatic speech recognition (ASR) based at least in part on the selecting.

2. An apparatus as recited in claim 1, the acts further comprising sending the processed audio signal at least partly after the preparing to a remote entity for performing the ASR on the processed audio signal.

3. An apparatus as recited in claim 1, wherein the comparing is effective to determine a room impulse response (RIR) of the environment.

4. An apparatus as recited in claim 1, wherein the comparing is effective to determine an amount of echo in respective portions of the first audio signal corresponding to respective lobes of the multiple lobes.

5. An apparatus as recited in claim 1, wherein the preparing comprises performing more acoustic echo cancelation (AEC) on the portion of the processed audio signal corresponding to the selected lobe than to a remainder of the processed audio signal.

6. A method comprising:

under control of one or more computing systems configured with executable instructions, measuring an acoustic characteristic of an environment, the measuring comprising:

instructing a speaker to emit a known sound in the environment;

capturing reflected sound, the reflected sound corresponding to reflection of the known sound by the environment; and comparing characteristics of the known sound to characteristics of the reflected sound at least in part to identify the acoustic characteristic;

selecting a portion of an audio signal, the portion corresponding to a lobe of a beampattern and the selecting based at least in part on: (1) an amount of energy associated with the lobe of the beampattern; (2) the acoustic characteristic of the environment, and (3) whether previous portions of audio signals corresponding to the lobe of the beampattern have been previously selected for enhancement; and enhancing the portion of the audio signal corresponding to the lobe to increase a signal-to-noise (SNR) ratio of the portion of the audio signal.

7. A method as recited in claim 6, wherein the acoustic characteristic comprises a room impulse response (RIR) of the environment.

8. A method as recited in claim 6, wherein a device within the environment generates the audio signal, and the acoustic characteristic comprises an amount of echo received by the device from at least one direction within the environment.

9. A method as recited in claim 6, wherein the enhancing comprises devoting additional processing resources for performing acoustic echo cancellation (AEC) on the portion of the audio signal as compared to a remainder of the audio signal.

10. A method as recited in claim 6, wherein the enhancing comprises devoting more resources of the one or more computing systems to processing of the portion of the audio signal corresponding to the lobe as compared to an amount of the resources devoted to a remainder of the audio signal.

11. A method as recited in claim 6, wherein the acoustic characteristic comprises a room impulse response (RIR) of the environment, and the acts further comprise measuring the RIR of the environment, the measuring comprising:

instructing the speaker to emit a second known sound in the environment;

capturing reflected sound, the reflected sound corresponding to reflection of the second known sound by the environment;

comparing characteristics of the second known sound to characteristics of the reflected sound at least in part to identify the RIR.

12. A method as recited in claim 6, further comprising determining whether previous portions of audio signals corresponding to the lobe of the beampattern have been previously selected more than a threshold number of times.

13. A method as recited in claim 6, further comprising determining whether previous portions of audio signals corresponding to the lobe of the beampattern have been previously selected more than a threshold percentage of times.

14. A method as recited in claim 6, further comprising determining whether previous portions of audio signals corresponding to the lobe of the beampattern have been more recently selected for enhancement.

15. One or more non-transitory computer-readable media storing computer-executable instructions that, when executed by one or more processors, cause the one or more processors to perform acts comprising:

measuring a value of an acoustic characteristic of an environment, the measuring comprising:

instructing a speaker to emit a known sound in the environment;

capturing reflected sound, the reflected sound corresponding to reflection of the known sound by the environment; and comparing characteristics of the known sound to characteristics of the reflected sound at least in part to identify the acoustic characteristic;

capturing speech uttered by a user within the environment;

generating an audio signal that includes the speech;

processing the audio signal by applying a set of beamformer coefficients to the audio signal to generate a processed audio signal that represents a beampattern, the beampattern having multiple lobes each focused on a region within the environment; determining a portion of the processed audio signal corresponding to one or more lobes of the beampattern focused on one or more regions from which user speech was previously determined to have originated from;

comparing the value of the acoustic characteristic to a previously measured value of the acoustic characteristic of the environment; and at least partly in response to determining that the value and the previously measured value differ by less than a threshold amount, applying relatively more processing resources to the portion of the processed audio signal and relatively less processing resources to a remainder of the processed audio signal.

16. One or more non-transitory computer-readable media as recited in claim 15, the acts further comprising applying substantially equal processing resources to the portion of the processed audio signal and the remainder of the processed audio signal at least partly in response to determining that value and the previously measured value do not differ by less than the threshold amount.

17. One or more non-transitory computer-readable media as recited in claim 15, wherein the acoustic characteristic comprises a room impulse response (RIR) of the environment.

18. One or more non-transitory computer-readable media as recited in claim 17, wherein measuring the RIR of the environment comprises:
   instructing a speaker to emit a second known sound within the environment;
   capturing sound of the second known sound that has been reflected by one or more surfaces within the environment;
   generating an audio signal based on the captured sound; and
   comparing the captured sound in the audio signal to the second known sound to determine a disparity there between, the RIR being based at least in part on the disparity.

19. One or more non-transitory computer-readable media as recited in claim 15, wherein the acoustic characteristic is based at least in part on an amount of echo in the environment.

20. One or more non-transitory computer-readable media as recited in claim 15, wherein the processing resources applied to the portion and to the remainder of the audio signal increase a signal-to-noise (SNR) ratio of the portion and the remainder of the audio signal.

21. One or more non-transitory computer-readable media as recited in claim 15, wherein the value of the acoustic characteristic is measured after capturing the speech uttered by the user, and the previously measured value comprises a value of the acoustic characteristic that was measured prior to the capturing of the speech.

22. One or more non-transitory computer-readable media as recited in claim 15, wherein the applying is further based at least in part on an amount of energy associated with the one or more lobes from which user speech was previously determined to have originated from.

* * * * *